United States Patent [19]

Rettich et al.

[11] 4,370,714
[45] Jan. 25, 1983

[54] ELECTRONICALLY ACTUATED BRAKE SYSTEM

[75] Inventors: Thomas A. Rettich, Monrovia; Raymond D. Woodworth, Irvine, both of Calif.

[73] Assignee: Minnesota Automotive, Inc., North Mankato, Minn.

[21] Appl. No.: 180,679

[22] Filed: Aug. 25, 1980

[51] Int. Cl.³ ............................................. B60T 8/02
[52] U.S. Cl. ...................................... 364/426; 303/20
[58] Field of Search .................. 364/426; 303/7, 20, 303/100

[56] References Cited

U.S. PATENT DOCUMENTS

| | | | |
|---|---|---|---|
| 3,507,542 | 4/1970 | Cannella | 303/7 |
| 3,747,992 | 7/1973 | Schnipke | 303/7 X |
| 3,802,745 | 4/1974 | Strifler et al. | 303/20 X |
| 3,910,646 | 10/1975 | Grix | 303/100 |
| 3,981,542 | 9/1976 | Abrams et al. | 303/20 |
| 4,084,859 | 4/1978 | Bull et al. | 303/20 X |

Primary Examiner—Jerry Smith
Attorney, Agent, or Firm—Charles H. Thomas

[57] ABSTRACT

A pulse width modulated control signal is applied to inlet and outlet solenoid valves in a closed fluid vehicle brake system. The electronic actuating circuitry can control a fluid brake system in a towed vehicle from a towing vehicle without fluid connections therebetween. The closed fluid brake system provides an electrical feedback signal that tracks an electrical command signal applied by the towing vehicle operator through a manually operated command signal transducer to produce an error signal to maintain a command pressure in the towed vehicle fluid brake system. The inlet and outlet valves are repeatedly opened and closed in accordance with the width of a train of pulses. The pulse width is proportional to the difference between an electrical command signal and an error signal.

13 Claims, 3 Drawing Figures

ELECTRONIC CONTROLLER

ELECTRONICALLY ACTUATED BRAKE SYSTEM

BACKGROUND OF THE INVENTION

The present invention relates to an electronically controlled fluid actuated vehicle brake system, especially a brake system involving both a towing vehicle and a towed vehicle.

DESCRIPTION OF THE PRIOR ART

Various electronic controls have been attempted for fluid actuated brake systems in wheeled vehicles, including tandem vehicle arrangements involving both a towing and a towed vehicle, such as a truck tractor and a truck trailer. In conventional electrical control systems for vehicle pnuematic or hydraulic brakes, a pressure transducer, load cell, or accelerometer is interposed between a truck tractor and trailer. The concept for actuation of one type of conventional elecronically actuated trailer brakes is that mechanical strain on the accelerometer, which may include the draw bar or other connecting mechanism, is transformed to proportional electrical signal which is of variable strength responsive to the deceleration of a tractor relative to a trailer. The electrical strain signal is amplified and applied to a control valve. In other electrical controls for fluid actuated vehicle brakes a pressure transducer in the towing vehicle produces an electrical signal that is reconverted to a corresponding pressure in the towed vehicle.

Conventional electronically controlled fluid actuated brake systems have several disadvantages. Such conventional systems do not provide electrical feedback to influence the fluid pressure applied to the system. Accordingly, conventional systems are unable to provide the precision and rapid response necessary to apply the brakes of a vehicle so as to stop a pair of tandem vehicles as desired by the operator. Such conventional devices are subject to the inaccurate application of braking force due to thermal effects on the tow bar or accelerometer, amplifier drifting, and other effects attributable to ambient conditions or component aging. Since extreme accuracy and instant response in the application of vehicles brakes is necessary to avoid collisions and to prevent trailer jackknifing and skidding, conventional electronic controls for fluid brake systems have proven unsatisfactory.

With conventional electronic brake controls the driver in a truck tractor is able to apply the brakes to both the tractor and a towed trailer, but the operator is unable to rectify any imbalance in braking as between the trailer and tractor. That is, even minute variations in the electrical signals generated will produce a condition in which the trailer brakes harder than the tractor, thereby dragging the tractor to a halt or causing the trailer to skid. Alternatively the tractor may brake harder than the trailer, in which case the inertia of the trailer prevents the towing and towed vehicles from stopping within the distance contemplated by the vehicle operator.

SUMMARY OF THE INVENTION

The present invention is an electronically controlled brake system used for a towed wheeled vehicle. The brake system of the invention employs a small, self-contained, fluid actuated set of brakes located entirely within the towed vehicle. The only connections to the towing vehicle are electrical connections, so that fluid transfer lines between the vehicles are avoided. This reduces the liklihood of fluid leaks and allows a truck trailer braking system to be employed that requires only a few cubic millimeters of hydraulic liquid which is located almost entirely at the vehicle brakes, thereby obviating the necessity for lengthy hydraulic lines.

The invention also provides for a closed pressurized system in which the inlet valve from a high pressure fluid supply line and an outlet valve in a reduced pressure fluid return line may both be closed once a steady state condition is reached. Even when there is a hydraulic leak in the system the electronic control of the invention will cause the brakes to be applied with the force dictated by the electrical command signal generated by the vehicle operator. The closed brake system for the trailer will hold the load to an extreme position and tolerance even when electrical control connections to the braking systems are severed. Precise valve aperture control is provided which avoids instability and degraded operational performance. Also, by using pulse width modulated signals to the valves, severe pressure transients are avoided, even as the system responds rapidly to changing conditions.

According to the invention a manually derived external command is provided by means of a pressure transducer connected to the master brake cylinder of the towing vehicle. The electrical command signal is provided ultimately to two comparators, each of which drives a separate solenoid valve. In one embodiment of the invention, both valves are normally in a closed state until a command signal is generated and the corresponding pressure applied in the trailer brake system. The trailer brake system employs a high pressure fluid supply means, which may include an accumulator, a pump and a reservoir. A high pressure fluid supply line leads from the accumulator to the brakes and a solenoid actuated inlet valve is connected in the high pressure supply line. A reduced pressure fluid return line leads from the brakes to the reservoir of the fluid supply, and a solenoid actuated outlet valve is connected in the reduced pressure return line.

A pressure transducer is located in the towed vehicle in communication with the brakes for providing an electrical feedback signal therefrom. A manual command signal transducer located in the towing vehicle produces an electrical command signal proportional to a desired pressure in the fluid actuated brakesin the towed vehicle. The command signal transducer is preferably adapted for connection to the master brake cylinder in the towing vehicle fluid braking system by means of a T-fitting. A differential amplification system receives the operator generated electrical command signal and the feedback signal from the towed vehicle brakes to provide an error signal. A pulse width modulated control arrangement selectively actuates the solenoids of the inlet and outlet valves in accordance with the polarity and magnitude of the error signal.

If the error signal amplitude is large, the electrical pulse width of pulses to the valve solenoids is great. Conversely, a small error amplitude will produce a narrow pulse width.

In the preferred embodiments of the system, the pulse width modulated control circuitry includes a triangular waveform generator that is coupled to separate comparators which are associated with each of the solenoid actuated valves. During the time that the magnitude of the triangular waveform exceeds the magnitude of the error signal, both the inlet and outlet valves are closed. Depending upon the polarity of the error signal, either the inlet valve or the outlet valve will be opened during the time that the error signal exceeds the magnitude of the triangular waveform. As a result, pulses of increasingly narrow width are applied to the solenoid actuated valves as the system reaches its commanded brake pressure following actuation of the brake system by the vehicle operator. The valve associated with the actuated comparator will continue to be pulsed until the error voltage is reduced to zero as the magnitude of the feedback signal approaches the magnitude of the command signal. When this condition is achieved the electrical command signal is equal to the electrical feedback signal and the previously actuated valve is closed.

When both valves are closed a nonactivated or steady state condition exists in which the absence of an error signal inhibits the generation of pulses to the comparators. The drives to the solenoid valves are thereby deactivated. When there is no command signal generated at all, the outlet valve in the reduced pressure return line is opened, in one embodiment of the invention, so that minor transients in the system will not produce hunting by the feedback signal which would otherwise result in chattering of the inlet and outlet valves. In this fashion, valve life is significantly enhanced.

Preferably, electrically illuminable indicators are associated with each of the solenoid actuated inlet and outlet valves. These indicators signify the status of actuation of each of the valves and the vehicle operator is able to observe when any malfunction in valve operation occurs.

A threshold detector is also preferably employed to suppress the error signal when the electrical command signal is less than a predetermined magnitude. This prevents the system from responding to a low level command signal, which can occur as a result of component drifting.

Another feature of the preferred embodiment of the invention is the provision of circuitry for limiting the absolute magnitude of the error signal. This serves as an electronic orifice that prevents inordinately great shocks to the vehicle hydraulic system by preventing the unrestrained flow of fluid to and from the brake system upon the initial generation of an error signal.

It is advantageous for a gain adjustment to be located in a position accessible to an operator of a driving vehicle. This gain adjustment is preferably located in the vehicle cab and is useful in readily correcting any imbalance in braking force that may occur as between the towing and towed vehicle.

The invention may be described with greater clarity and particularly by reference to the accompanying drawings.

DESCRIPTION OF THE EMBODIMENT

Figure 1:
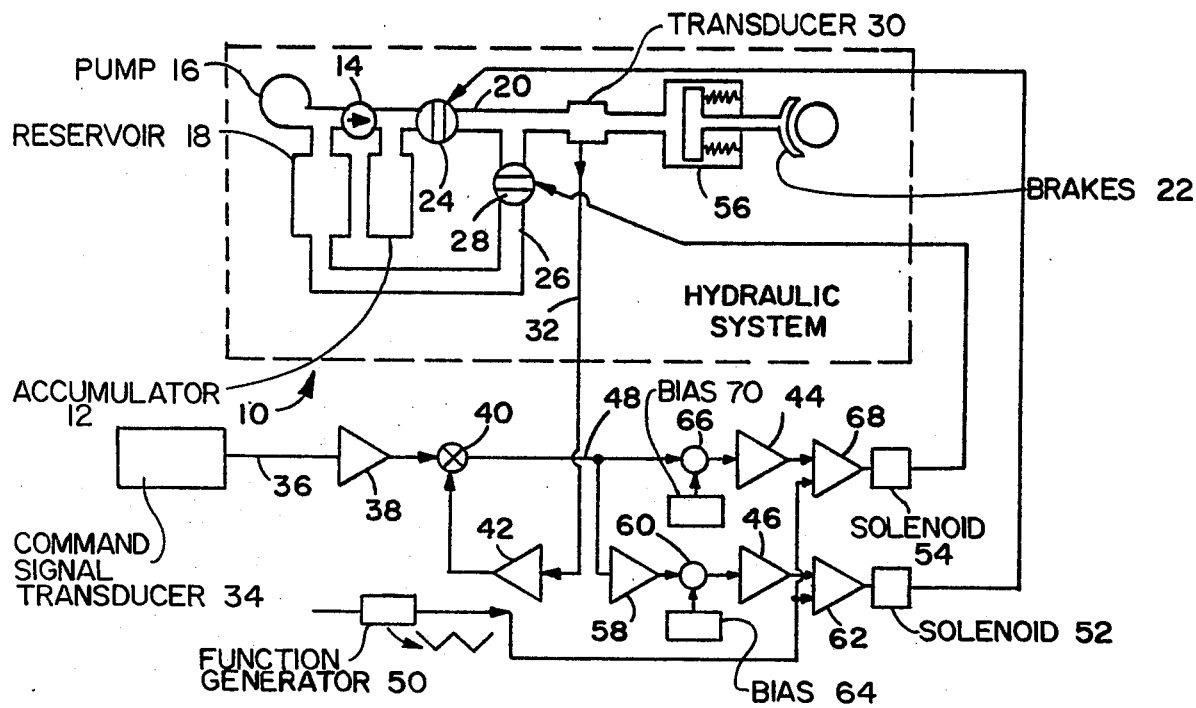
FIG. 1 is a block diagram of an electronically controlled fluid brake system according to the invention.

FIG. 1 depicts in block form an electronically controlled fluid actuated brake system for a towed wheeled vehicle. The brake system includes a hydraulically operated portion 10 located in the towed vehicle which includes a high pressure fluid supply means including an accumulator 12, a check valve 14, a pump 16 and a reservoir 18. A high pressure fluid supply line 20 leads from the accumulator 12 in the fluid supply to actuators 56 and brakes 22 at each of the vehicle wheels. The actuators and brakes are depicted collectively in FIG. 1. A solenoid actuated inlet valve 24 is connected in the high pressure supply line 20. A reduced pressure fluid return line 26 leads from the actuators 56 of the brakes 22 to the reservoir 18 of the high pressure supply. A solenoid actuated outlet valve 28 is connected in the reduced pressure return line 26.

A pressure transducer 30 is in communication with the brakes 22 for providing an electrical feedback signal therefrom on an electrical connection line indicated at 32. A manual command signal transducer 34 located in the towing vehicle produces an electrical command signal on line 36 which is proportional to a desired pressure in the fluid actuated trailer brakes 22. Differential amplification means, including the amplifiers 38, 40, 42, 44 and 46, are coupled to receive the command signal on line 36 and the feedback signal on line 32 to provide an error signal on line 48. A pulse width modulated control means is provided and includes a precision function generator 50 which is coupled to selectively actuate the solenoids 52 and 54, respectively associated with the inlet valve 24 and the outlet valve 28. The function generator 50 actuates the solenoids 52 and 54 in accordance with the polarity and magnitude of the error signal on line 48.

Input pressure to the actuator 56 for the brakes 22 is sensed by the linear electrical pressure transducer 30. The transducer 30 produces an electrical output feedback signal on line 32 of voltage proportional to the pressure applied to the brake actuator 56 by the hydraulic fluid therein. The feedback signal on line 32 is amplified by the amplifier 42 and fed in opposition to a differential amplifier 40, which compares the feedback signal with the amplified electrical command signal provided on line 36. The amplifiers 38 and 42 respectively amplify and filter the electrical command signal on line 36 and the electrical feedback signal on line 32. These signals are algebraically differenced in the differential amplifier 40 to form an error signal on line 48. The voltage polarity, positive or negative, associated with the error signal on line 48 is used to logically determine which of the solenoid actuated valves 24 or 28 must be activated.

The command signal transducer 34 preferably has a fluid fitting adapted for coupling to a vehicle master brake cylinder in a towing vehicle, such as a truck tractor. When the brakes are to be applied to the truck tractor and trailer it is important for the brake application to be synchronous and uniform. The truck tractor brakes are typically unmodified and are of the conventional full hydraulic type. The same pressure which is applied to the master cylinder of the towing vehicle is also applied to the command signal transducer 34, which generates a proportional voltage on the electrical command signal line 36. If the pressure on the trailer brake actuators 56 is initially zero, as is the case when the vehicle is cruising, both inlet valve 24 and the outlet valve 28 are normally closed in the embodiment depicted in FIGS. 1 and 2. The electrical feedback signal on line 32 is zero volts, since there is no pressure on the actuators 56.

When the vehicle operator applies the brakes to the truck tractor, an electrical command signal on line 36 is amplified by the amplifier 38 and creates a positive polarity error signal on line 48, since the difference between the electrical command signal on line 36 and the electrical feedback signal on line 32 is positive. A positive error signal on line 48 will ultimately create pulse width modulated signals which operate the solenoid 52 and respectively drive the fluid inlet valve 24 to an open position during the duration of pulses to the solenoid 52.

As the inlet valve 24 is driven open, pressure begins to increase in the trailer brake actuators 56. The pressure transducer 30 reflects this increased pressure and produces a feedback signal of voltage proportional thereto on the feedback line 32. The inlet valve 24 is pulsed open with each pulse to the solenoid 52 to allow additional hydraulic fluid into the system to reach the actuator 56. The pressure transducer 30 reflects this increase and produces a feedback signal of voltage proportional to this pressure on the feedback line 32. When the inlet valve 24 passes a sufficient amount of hydraulic fluid to create a feedback signal on line 32 equal to the electrical command signal on line 36, the error signal on line 48 becomes zero. A zero error signal on line 48 inhibits the generation of further pulses to the solenoid 52 and the inlet valve 24 returns to its normally closed position. Thereupon the inlet valve 24 and the outlet valve 28 are closed and the hydraulic pressure commanded by the command signal on line 36 is maintained in the trailer brake actuator 56.

When a desired reduced pressure is signaled, such as by release of the brake pedal in the truck tractor, the input voltage on the electrical command signal line 36 from the command signal transducer 34 is reduced. This condition causes the error signal on line 48 at the output of the differential amplifier 40 to become negative since the feedback signal on line 32 is more positive than the command signal on line 36. A negative error signal on line 48 initiates action to create pulse width modulated signals which are applied to the solenoid 54 of the outlet valve 28. The valve 28 is thereupon repeatedly momentarily opened with each pulse to incrementally reduce the controlled pressure at the trailer brake actuators 56. Because the error signal on line 48 is negative, no action is taken to pulse the inlet valve 24. Because the inlet valve 24 is in a normally closed state, fluid from the accumulator 12 cannot flow to the trailer brake actuators 56. The outlet valve 28 will continue to be pulsed until the voltage of the feedback signal on line 32 is reduced and equals the voltage of the command signal on line 36. When this condition is reached the pulsing action stops and the outlet valve 28 returns to a normally closed position. At all times thereafter until the next signal on line 32 the pressure in the actuators 56 remains constant and proportional to the voltage of the command signal on line 36.

Figure 2:
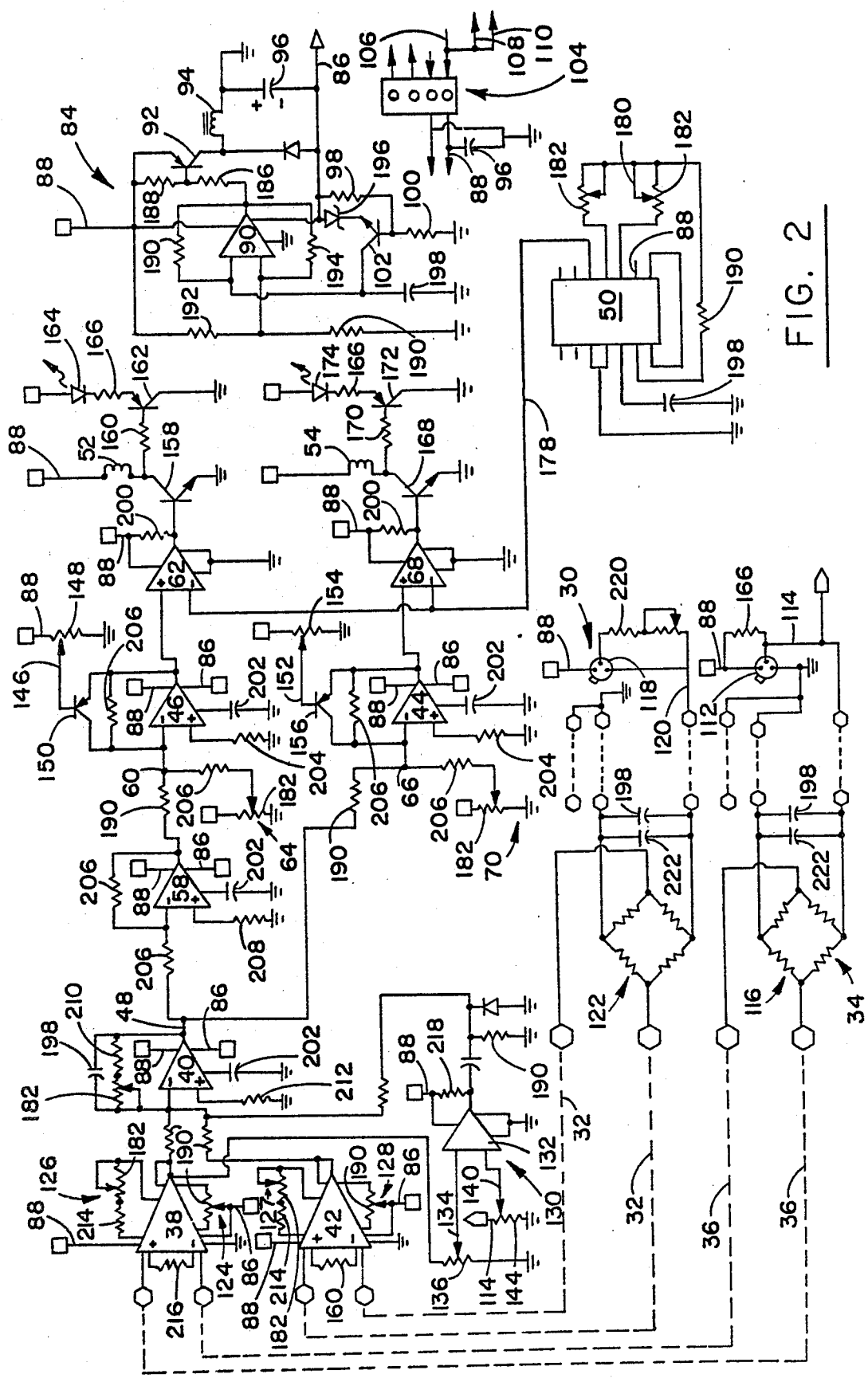
FIG. 2 is a detailed schematic of the electrical control system of the invention.

When in a nonactivated or steady state condition the inlet valve 24 and the outlet valve 28 are both in a normally closed position in the embodiment depicted in FIGS. 1 and 2. A steady state condition is that condition which exists when an external input command on line 36, through the actions of the electronic controller, controls the inlet valve 24 and the outlet valve 28 to maintain a constant and proportional pressure in the trailer brake actuators 56. This state can exist for any pressure from zero pounds per square inch to the maximum pressure provided by the accumulator 12 of the high pressure fluid supply means.

When reduced pressure to the trailer brake actuators 56 is required, hydraulic fluid flows through the outlet valve 28 as that valve is pulsed open. Fluid flows through the reduced pressure return line 26 that leads to the hydraulic fluid reservoir 18. The hydraulic fluid is at low pressure within the reservoir 18. A hydraulic pump 16 is responsive to pressure within the high pressure accumulator 12 and is actuated to maintain pressure within the accumulator 12 between upper and lower limits. The pump 16 forces hydraulic fluid through a check valve 14 into the accumulator 12 when pressure within the accumulator 12 drops to the lower limit to thereby re-establish pressure in the accumulator 12 at the upper limit. The upper limit of pressure within the accumulator 12 is between about 800 and 1000 pounds per square inch, while the lower limit is about 600 pounds per square inch.

The operation of the inlet valve 24 and outlet valve 28 as a function of time is quite critical. Precise valve aperture control is required in order to avoid instability and degraded operational performance of the brakes 22. In order to minimize adverse fluctuation in the controlled pressure in the actuators 56, the electronic controller issues both simultaneous and alternate pulse width modulated valve commands to the appropriate one of the solenoids 52 and 54 in order to alleviate or attenuate severe pressure transients. The selection of the solenoid 52 or 54 for actuation is dependent upon the polarity of the error signal on line 48. A positive voltage polarity error signal will be amplified by an amplifier 58, algebraically summed with a threshold bias at a voltage summing junction 60, amplified again by another amplifier 46 and directed through a comparator 62 to the solenoid 52 for the inlet valve 24. The bias to the summing junction 60 is provided by a biasing circuit 64.

While the error signal on line 48 simultaneously is directed to another summing junction 66 for threshold comparison, and to another amplifier 44, and another comparator 68, the solenoid 54 is not actuated since the signal to the comparator 68 is of a polarity which will produce no output. Accordingly, the outlet valve 28 remains closed when the error signal on line 48 is of a positive polarity. The threshold bias to the summing junction 66 is applied by a biasing circuit 70.

Conversely, a negative polarity error signal on line 48 operates through the summing junction 66, the amplifier 44 and the comparator 68 to operate the solenoid 54 to open the outlet valve 28. The threshold biasing circuit 70 establishes a minimum voltage level which must be achieved before a signal is passed to the amplifier 44. The same negative signal on line 48 also drives the amplifiers 58 and 46 and the comparator 62, but voltage polarity is such that there is no output from the comparator 62 to drive the solenoid 52 to open the inlet valve 24.

The function of the electronic control of the invention is to precisely control the valve aperture opening time. A pulse width modulation technique is used to accomplish this. The analog error signal on line 48 is converted to an equivalent digital pulse of constant amplitude. The pulse width is proportional to the magnitude of the analog error signal on line 48. If the error signal amplitude is large, the digital pulse is wide. Conversely, a small error amplitude will produce a pulse of narrow width.

A triangular waveform generator 50 continuously produces electrical pulses of a triangular waveform 72, as illustrated in FIG. 3a. The amplitude and frequency of the triangular waveform 72 are uniform. The triangular waveform is directed to one input of each of the two separate comparators 62 and 68, illustrated in FIG. 1. The comparators 62 and 68 each have an opposing input ultimately derived from the differential amplifier 40 that produces the error signal 48. One or the other of the comparators 62 or 68 will produce pulses of width proportional to the error signal 48, depending upon the polarity of the error signal. These pulses are illustrated, for example, in FIGS. 3b and 3d.

Figure 3:
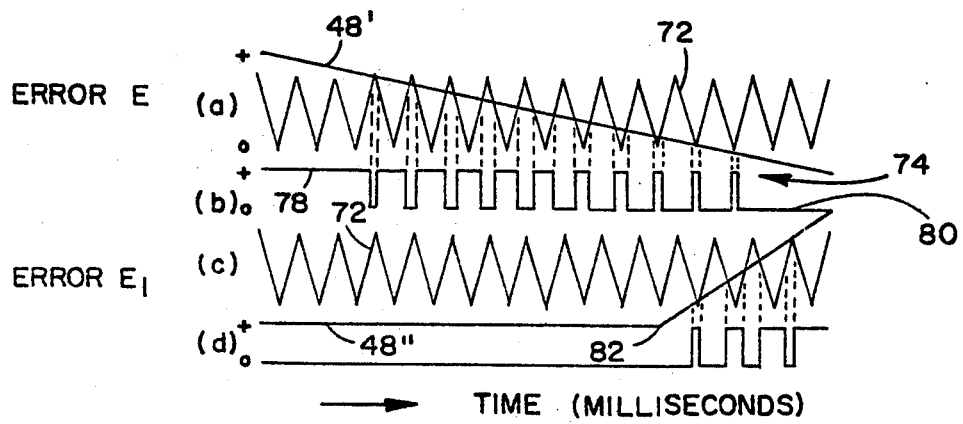
FIG. 3 depicts waveforms that are developed during the operation of the system.

FIG. 3 illustrates a time plot of the triangular waveform 72 superpositioned with the analog error signal 48' on line 48. FIGS. 3a and 3b pictorially illustrates how the analog comparators 62 and 68 generate the variable pulse width valve drive signals shown in FIGS. 3b and 3d.

The output of the comparators 62 and 68 is positive whenever the error signal on line 48 is greater than the triangular wave amplitude of the waveform 72 to which it is compared. Similarly, during the time that the triangular waveform 72 is greater than the error signal, the comparator output is zero. The pulse train is generated having a width proportional to the analog error signal. When the error signal is near zero there is no output from either comparator 62 or 68. In this condition both the inlet valve 24 and the outlet valve 28 are fully closed, and this condition can be described as a zero modulation condition. One hundred percent modulation, on the other hand, exists when the error signal on line 48 is of greater amplitude than the triangular wave amplitude of the waveform 72. In this condition the actuated valve is fully open. The valve drive control therefore operates between zero and one hundred percent modulation conditions.

As an example, a positive error signal on line 48 is illustrated as an input 48' to the comparator 62 in FIG. 3a. Initially, the signal 48' is of a voltage which exceeds the maximum amplitude of the waveform 72, so that the pulse train 74 is at 100 percent modulation in the region indicated at 78 in FIG. 3b. As pressure builds in the actuators 56, the feedback signal on line 32 increases to thereby decrease the magnitude of the signal 48' to the comparator 62. As the voltage of the signal 48' drops, the comparator 62 produces a zero output for increasingly long periods of time. This output is indicated as pulses 74 of increasingly narrow pulse width in the output waveform of the comparator 62 depicted in FIG. 3b. Ultimately, the signal 48' will fall below the threshold established by the bias circuit 64, so that zero modulation exists in the region 80 of the waveform 74.

Simultaneously, the positive error signal 48 is combined with a negative bias applied by the biasing circuit 70 and the resulting signal is inverted by the amplifier 44 to produce the signal 48" illustrated in FIG. 3c. As the signal on line 48 continues to drop, ultimately the signal 48" begins to rise from its steady state bias condition as indicated at location 82 in FIG. 3c. The signal 48" is applied to the comparator 68. As is apparent with reference to FIGS. 3b and 3d, a pulse overlap condition exists in the case of a small error signal. Both valves are actuated simultaneously. Voltage adjustments applied by the bias circuits 64 and 67 produce voltages which are algebraically subtracted from the signals 48' and 48", respectively, at summing junctions 60 and 66, respectively. The biases from circuit 64 and 70 serve as adjustments to control the valve overlap and also to minimize system hysteresis. This action also improves system transient response. By adjusting the biases of circuit 64 and 70, a dead band of positive and negative threshold is established at which the inlet valve 24 and outlet valve 28 are both quiescent.

The schematic circuitry of the electonically controlled brake system of FIG. 1 are illustrated in FIG. 2. The electronic control system includes a d.c. to d.c. converter circuit 84 for providing a negative twelve volt supply at 86 from a positive twelve volt input 88 that is ultimately coupled to the positive terminal of a lead acid storage battery with which truck tractors are equipped. The positive input on line 88 powers an operational amplifier 90 which functions as a free running oscillator. The positive twelve volt input 88 is also connected to a transistor 92 which serves as a switch. The oscillator 90 produces a square wave output which opens the switching transistor 92 to direct current through an inductor 94. As the switching transistor 92 periodically goes open, there is a collapsing magnetic field in the inductor 94 which produces a back EMF that charges a large power capacitor 96. Energy is stored in the capacitor 96 and is supplied as a minus twelve volt supply on line 88. The resistors 98 and 100 attenuate the voltage supply and change the drive characteristics to a transistor 102 which supplies current to the oscillator 90. The circuit 84 serves as a d.c. to d.c. converter for converting a positive twelve volt d.c. supply from the electrical system of the vehicle to a supply of opposite polarity at line 86 which is coupled to power inputs to the differential amplifiers 38, 40, 42, 44, 46 and 68, as indicated.

A terminal strip 104 is provided for distributing various power and drive signals. The positive twelve volt terminal of the vehicle battery is connected by line 106 to the terminal strip 104, and is also connected by line 108 to power the inlet valve 24 and to line 110 to power the outlet valve 28.

The command signal transducer 34 includes a voltage regulator 112 which provides a constant positive ten volt voltage source as an output on line 114. The command signal transducer 34 also includes a command bridge 116, some of the resistors of which are of variable resistance and are located in contact with the hydraulic fluid, so that their resistance is pressure dependent. The output of the command bridge 116 is provided on two bridge legs which collectively carry the electrical command signal as a voltage differential indicated as a single connection 36 in FIG. 1. The output legs of the command bridge 116 are connected as opposing inputs to the command signal amplifier 38.

The pressure transducer 30 for providing the feedback signal includes a current regulator 118 which provides a constant current source on line 120. The pressure transducer 30 also includes a feedback bridge to which the constant current source is coupled. The feedback bridge 122 includes legs with resistors therein, some of which are reference resistors and others of which are located in hydraulic fluid and are variably dependent upon pressure. The output legs of the feedback bridge 122 are connected as a current differential to opposing inputs to the feedback amplifier 42.

The command signal differential amplifier 38 includes a bias adjustment 124 and a gain adjustment 126. Preferably the gain adjustment 126 includes a potentiometer wiper which is located in a position accessible to an operator of the vehicle. This allows the vehicle operator to adjust the braking power of the trailer brakes 22 relative to the truck tractor brakes. Such adjustments are useful in compensating for differences in load as occur when the truck trailer is loaded and unloaded. The feedback differential amplifier 42 also includes a gain adjustment 127 and a bias adjustment 128 which are normally not adjusted after initial calibration.

A threshold detector 130 is provided in association with the differential amplifiers 38 and 42 for suppressing the generation of an error signal when the electrical command signal on line 36 is less than a predetermined magnitude. The threshold detector 130 includes a differential amplifier 132 that includes a variable wiper 134 connected to a resistor 136. The resistor 136 is coupled to ground and to the output of the command differential amplifier 38. The other input to the threshold amplifier 132 is connected by an adjustable wiper 140 to a resistor 144 connected between ground and the positive ten volt supply line 114. The output of threshold amplifier 132 is coupled to the junction between the outputs of the differential amplifiers 38 and 42 to provide a bias which will suppress generation of an error signal on line 48 unless a command signal on line 36 is of at least a minimum voltage strength. This creates a pressure dead band in the system of approximately 20 pounds per square inch, so that minor transients or low level drifting do not continually drive the valves 24 and 28 and thus inordinately shorten valve life.

The electrical control system of the invention includes a wiper 146 and a resistor 148 which are coupled to the base of a transistor 150 to limit the feedback from the output of the differential amplifier 46. A corresponding wiper 152, resistor 154 and transistor 156 are provided in association with the differential amplifier 44. Together these circuits limit the absolute magnitude of the error signal that is applied to either the comparator 62 or the comparator 68.

To operate the solenoid 52 the output of the comparator 62 forward biases the base of a transistor 158. The collector of the transistor 158 is also connected through a resistor 160 to the base of a transistor 162. A light emitting diode 164 is coupled through a resistor 166 to the emitter of transistor 162, the collector of which is connected to ground. Similarly, the output of comparator 68 operates the solenoid 54 through a transistor 168. The collector of transistor 168 is connected through a resistor 170 to the base of another transistor 172. A light emitting diode 174 is coupled through a resistor 166 to the emitter of transistor 172, the collector of which is coupled to ground.

The light emitting diodes 164 and 174 thereby form separate electrically illuminable indicators associated with each of the solenoid actuated inlet and outlet valves 24 and 28, respectively. The light emitting diode 164 signifies the status of actuation of the inlet valve 24. That is, when comparator 62 drives the transistor 158 to open the inlet valve 24, the light emitting diode 164 is illuminated. Similarly, when the comparator 68 drives the transistor 168 to operate the outlet valve 28, the light emitting diode 174 is illuminated. Even though the valves 24 and 28 are opened and closed in accordance with the pulsed output of the comparators 62 and 68, the pulse frequency is so rapid that during actuation of the valves 24 and 28, the associated light emitting diodes 164 and 174 appear to be continuously illuminated.

The precision function generator 50 provides a number of different waveform outputs. The triangular waveform output is provided on line 178 to both of the negative inputs of the comparators 62 and 68. The precision function generator 50 includes a wiper 180 and a resistor 182 which may be used to adjust the frequency of the triangular waveform 72, depicted in FIG. 3.

In the embodiment of the invention depicted, both of the valves 24 and 28 are normally maintained in the closed condition in the absence of a command signal on line 36. In an alternative embodiment, the outlet valve 28 may be maintained in an open condition in the absence of a command signal on line 36. This will ensure that the fluid pressure in the accumulators 56 for the trailer will remain at zero pressure, despite any transient that may pass to the comparators 62 and 68. Such an arrangement prevents the occurence of a condition in which the valves are continually chattering due to hunting of the system to trace transients or other spurious voltages.

The recommended specifications for the circuit components illustrated in FIG. 2 are set forth hereinafter in Table 1.

TABLE 1

| Resistors | | | |
|---|---|---|---|
| 182 | 50K ohms | 218 | 510 ohms |
| 186 | 100 ohms | 220 | 300 ohms |
| 188 | 500 ohms | | |
| 190 | 10K ohms | | |
| 192 | 36K ohms | | |
| 194 | 20K ohms | | |
| 98 | 49K | | |
| 100 | 39K ohms | | |
| 166 | 560 ohms | | |
| 200 | 220 ohms | | |
| 148,154,136,144 | 20K ohms | | |
| 204 | 33K ohms | | |
| 206 | 100K ohms | | |
| 208 | 47K ohms | | |
| 210 | 8.2K ohms | | |
| 212 | 4.7K ohms | | |
| 214 | 82K ohms | | |
| 216 | 270 ohms | | |
| Capacitors | | | |
| 96 | 220 microfarads | | |
| 198 | .01 microfarads | | |
| 202 | 100 picofarads | | |
| 222 | 10 microfarads | | |
| Transistors | | | |
| 92 | MJE 2955 | | |
| 102 | 2N222A | | |
| 162,172 | 2N3906 | | |
| 158,168 | T IP141 | | |
| 150,156 | 2N4062 | | |
| Amplifiers | | | |
| 132,62,68,90 | LM311 | | |
| 44,46 | LM308 | | |
| 38,42 | AD521 | | |
| Inductors | | | |
| 94-1 millihenry | | | |
| Zener diodes | | | |
| 196 | IN753 | | |

Undoubtedly, numerous variations and modifications of the invention will become readily apparent to those familiar with electronically controlled vehicle brakes. Accordingly, the scope of the invention should not be construed to as limited to the specific embodiment depicted, but rather the invention is defined in the claims appended hereto.

We claim:

1. An electronically controlled brake system for a towed, wheeled vehicle having hydraulically actuated brakes comprising:
   a self-contained hydraulic fluid brake actuating system located entirely on a towed, wheeled vehicle and including:
   a high pressure hydraulic fluid supply means, a high pressure hydraulic fluid supply line leading from said fluid supply means to said brakes,
a solenoid actuated inlet valve connected in said high pressure hydraulic fluid supply line,
a reduced pressure hydraulic fluid supply line leading from said brakes to said high pressure hydraulic fluid supply means,
a solenoid actuated outlet valve connected in said reduced pressure hydraulic fluid return line,
a hydraulic pressure transducer in communication with said brakes for providing an electrical feedback signal therefrom, a manual command signal transducer located external to said towed vehicle for producing an electrical command signal proportional to a desired pressure in said hydraulically actuated brakes,
differential amplification means coupled to receive said command signal and said feedback signal to provide an error signal, and
pulse width modulated control means coupled to selectively actuate the solenoids of said inlet and outlet valves in accordance with the polarity and magnitude of said error signal.

2. An electronically controlled brake system according to claim 1 further characterized in that said pulse width modulated control means comprises separate comparator means coupled to separately drive said solenoids of said inlet and outlet valves, both comparator means having one input from said pulse width modulated control means and each comparator means having an opposing input from said differential amplification means.

3. An electronically controlled brake system according to claim 2 further characterized in that said comparator coupled to drive said solenoid of said outlet valve is biased to open said outlet valve in the absence of said electrical command signal.

4. An electronically controlled brake system according to claim 2 further characterized in that said pulse width modulated control means includes a triangular waveform generator coupled to said separate comparator means.

5. An electronically controlled brake system according to claim 4 further characterized in that said triangular waveform generator includes frequency adjustment means.

6. An electronically controlled brake system according to claim 1 further comprising a d.c. to d.c. converter for converting a d.c. supply from an electrical system of said vehicle to a supply of opposite polarity which is coupled to power inputs to said differential amplification means.

7. An electronically controlled brake system according to claim 1 further comprising separate electrically illuminable indicators associated with each of said solenoid actuated inlet and outlet valves for signifying the status of actuation of each of said valves.

8. An electronically controlled brake system according to claim 1 further comprising a threshold detector coupled to said differential amplification means for suppressing said error signal when said electrical command signal is less than a predetermined magnitude.

9. An electronically controlled fluid brake system according to claim 1 further comprising circuitry for limiting the absolute magnitude of said error signal.

10. An electronically controlled brake system according to claim 1 further characterized in that said command signal transducer has a fluid receiving fitting adapted for coupling to a vehicle master brake cylinder.

11. An electronically controlled brake system according to claim 1 further characterized in that said differential amplification means includes a gain adjustment means accessible to an operator of said vehicle.

12. An electronically controlled brake system for a towed, wheeled vehicle having fluid actuated brakes comprising:
a high pressure fluid supply means,
a high pressure fluid supply line leading from said fluid supply means to said brakes,
a solenoid actuated inlet valve connected in said high pressure supply line,
a reduced pressure fluid return line leading from said brakes to said high pressure fluid supply means,
a solenoid actuated outlet valve connected in said reduced pressure return line,
a pressure transducer including a constant current source coupled to a feedback bridge having output legs and coupled in communication with said brakes for providing an electrical feedback signal therefrom,
a manual command signal transducer located external to said towed vehicle for producing an electrical command signal proportional to a desired pressure in said fluid actuated brakes,
differential amplification means including a feedback amplifier, with said output legs of said feedback bridge connected as opposing inputs to said feedback amplifier and coupled to receive said command signal and said feedback signal to provide an error signal, and
pulse width modulated control means coupled to selectively actuate the solenoids of said inlet and outlet valves in accordance with the polarity and magnitude of said error signal.

13. An electronically controlled brake system for a towed, wheeled vehicle having fluid actuated brakes comprising:
a high pressure fluid supply means,
a high pressure fluid supply line leading from said fluid supply means to said brakes,
a solenoid actuated inlet valve connected in said high pressure supply line,
a reduced pressure fluid return line leading from said brakes to said high pressure fluid supply means,
a solenoid actuated outlet valve connected in said reduced pressure return line,
a pressure transducer in communication with said brakes for providing an electrical feedback signal therefrom,
a manual command signal transducer located external to said towed vehicle for producing an electrical command signal proportional to a desired pressure in said fluid actuated brakes and including a constant voltage source coupled to a command bridge having output legs,
differential amplification means coupled to receive said command signal and said feedback signal and which includes a command signal amplifier with said output legs of said command bridge are connected as opposing inputs to said command signal amplifier, and
pulse width modulated control means coupled to selectively actuate the solenoids of said inlet and outlet valves in accordance with the polarity and magnitude of said error signal.

* * * * *

UNITED STATES PATENT OFFICE
CERTIFICATE OF CORRECTION

Patent No. 4,370,714　　　　　Dated January 25, 1983

Inventor(s) Thomas A. Rettich and Raymond D. Woodworth

It is certified that error appears in the above-identified patent and that said Letters Patent are hereby corrected as shown below:

At column 2, line 48, change "brakesin" to --brakes in--.

At column 4, line 56, change "full" to --fully--.

At column 8, line 6, change "are" to --is--.

At column 11, line 5, change "supply" to --return--.

At column 11, line 12, start a new line and subdivision with the existing words "a manual command signal".

At column 12, line 61, delete the word "are".

Signed and Sealed this

Twenty-eighth Day of August 1984

[SEAL]

*Attest:*

*Attesting Officer*

GERALD J. MOSSINGHOFF

*Commissioner of Patents and Trademarks*